No. 671,505. Patented Apr. 9, 1901.
P. WINSOR.
SPEED CHANGING MECHANISM.
(Application filed July 18, 1900.)
(No Model.) 2 Sheets—Sheet 1.

Witnesses.
C. H. Gannett.
J. Murphy

Inventor:
Paul Winsor
by Jas. H. Churchill
Atty.

THE NORRIS PETERS CO., PHOTO-LITHO., WASHINGTON, D. C.

No. 671,505. Patented Apr. 9, 1901.
P. WINSOR.
SPEED CHANGING MECHANISM.
(Application filed July 18, 1900.)
(No Model.) 2 Sheets—Sheet 2.

Witnesses.
C. H. Gannett.
J. Murphy

Inventor.
Paul Winsor
by Jas. H. Churchill
atty.

UNITED STATES PATENT OFFICE.

PAUL WINSOR, OF WINCHESTER, MASSACHUSETTS.

SPEED-CHANGING MECHANISM.

SPECIFICATION forming part of Letters Patent No. 671,505, dated April 9, 1901.

Application filed July 18, 1900. Serial No. 24,120. (No model.)

*To all whom it may concern:*

Be it known that I, PAUL WINSOR, a citizen of the United States, residing in Winchester, in the county of Middlesex and State of Massachusetts, have invented an Improvement in Speed-Changing Mechanism, of which the following description, in connection with the accompanying drawings, is a specification, like characters on the drawings representing like parts.

This invention relates to a speed-changing mechanism especially designed and adapted, among other uses, to be employed on automobile vehicles; and it has for its object to provide mechanism whereby full energy may be transmitted to a rotatable part or device to rotate the same at speeds dependent on the resistance to be overcome. For this purpose I employ a reciprocating primary member connected to an engine or motor and a reciprocating secondary member or members disconnected from the primary member, but actuated thereby through the medium of an interposed compressible body, such as air or gas, and connected with the part or device to be rotated, so that the rotation of said driven part may be varied in accordance with the variations in the stroke of the secondary member or members. These and other features of this invention will be pointed out in the claims at the end of this specification.

Figure 1:
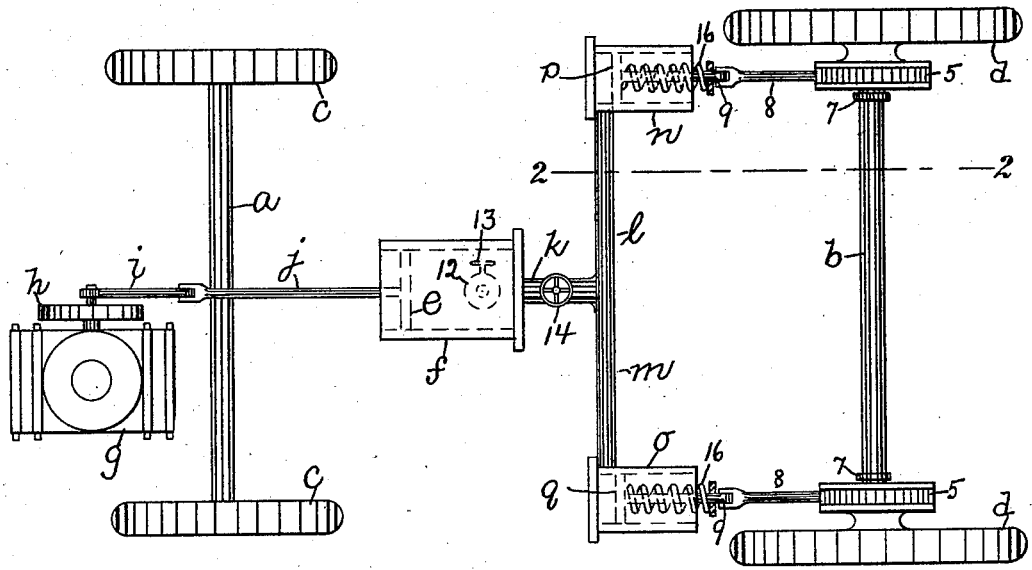
Figure 2:
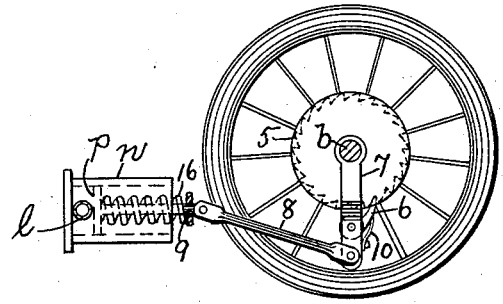
Figure 3:
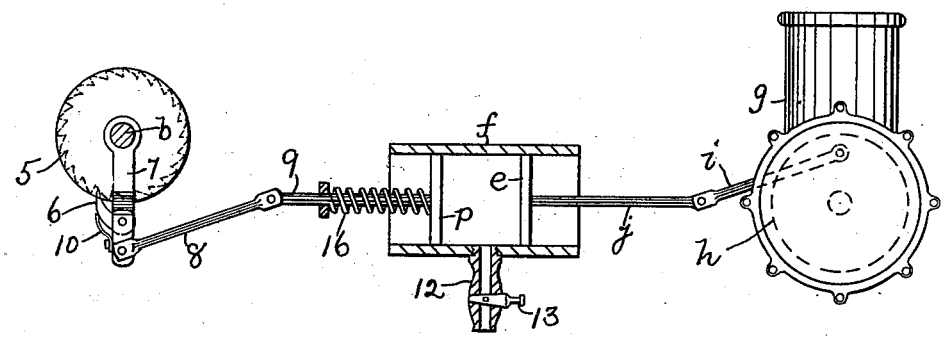
Figure 4:
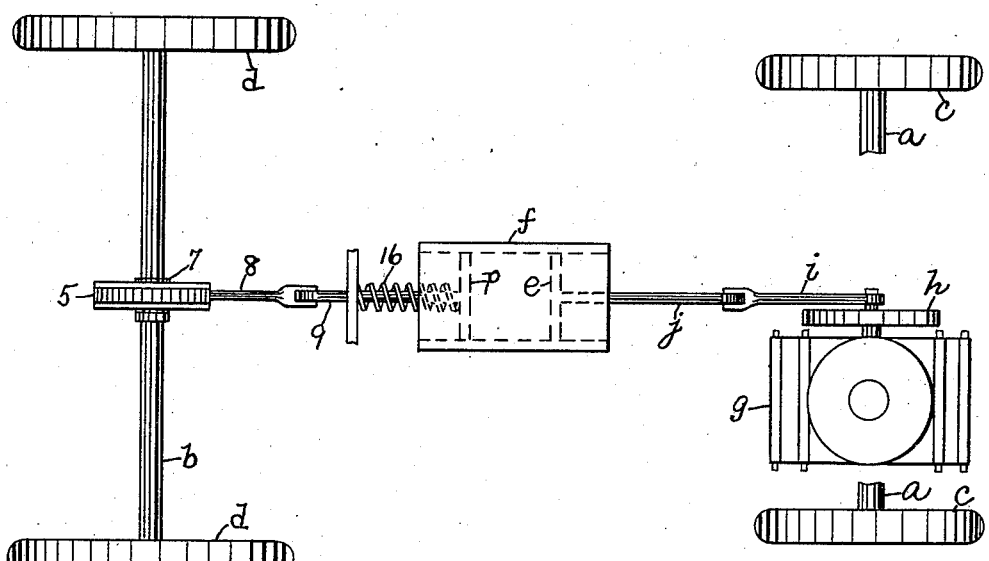

Figure 1 is a plan view of a sufficient portion of an automobile vehicle provided with a propelling mechanism embodying this invention to enable it to be understood; Fig. 2, a section on the line 2 2, Fig. 1; Fig. 3, a section and elevation of a modification to be referred to; Fig. 4, a plan view of the modification shown in Fig. 3, and Fig. 5 a section of another modification to be referred to.

Referring to Fig. 1, $a$ $b$ represent the front and rear axles of an automobile vehicle, which may be of any suitable or usual construction so far as the body of the vehicle is concerned, the said axles being provided with wheels $c$ $d$, the latter in the arrangement shown in Fig. 1 being loose on the axle $b$.

In accordance with this invention the automobile is propelled by means of a reciprocating primary member, shown as a piston $e$, contained in a cylinder $f$ and operatively connected to an engine $g$, which may be a gas, steam, or other engine, or it may be an electric motor, the said piston being shown as connected to an eccentric disk $h$ by a link or rod $i$ and piston-rod $j$. The cylinder $f$, as shown in Fig. 1, is connected at one end by a pipe $k$ and branch pipes $l$ $m$ with cylinders $n$ $o$, containing reciprocating secondary members or pistons $p$ $q$, which are operatively connected to the part or parts to be rotated, which, as shown in Fig. 1, are the wheels $d$, by mechanism which responds to the variation in the stroke of the reciprocating secondary pistons or members. In the present instance I have shown one form of mechanism for accomplishing this result which coöperates with each secondary member or piston and consists, essentially, of a ratchet-wheel 5, fast on each wheel $d$, a push-pawl 6, pivoted to a crank or arm 7, loose on the axle $b$, and connected by a link 8 to the piston-rod 9 of each secondary piston, the pawl 6 being held in engagement with the ratchet-wheel by a spring 10. The cylinder $f$, as shown, is provided with an inlet nipple or pipe 12, (see dotted lines, Fig. 1,) which is provided with a cock or valve 13, and the pipe $k$ may be provided with a valve 14, which controls the admission of air from the cylinder $f$ into the cylinders $n$ $o$.

The operation of the apparatus shown in Fig. 1 may be described as follows, assuming the cylinder $f$ and the pipes $k$ $l$ $m$ to be full of air, the valve 13 being closed, and the valve 14 open: In this case the primary member or piston is positively moved in the cylinder by the engine or motor, and on its forward stroke it compresses the air or other body in the said cylinder and pipes $k$ $l$ $m$ and also the air in the secondary cylinders, behind the pistons therein, and when a sufficient pressure is created between the primary and secondary members or pistons the secondary pistons are moved forward, and by the push-pawl 6 and ratchet-wheel 5 the parts to be driven are rotated. The secondary pistons may be moved backward by mechanical means, such as a spring 16, or they may be moved backward by the vacuum which may be formed in the primary cylinder on the return stroke of its piston. By means of the valve 14 the quantity of air admitted into the secondary cylinders may be controlled, so as to regulate the speed of rotation of the driven part or member, and thus regulate the speed of the vehicle. In Fig. 1 the ratchet-wheel 5 is attached to a wheel *d* and the latter is loose on the axle *b*, whereas in Fig. 4 the ratchet-wheel 5 is connected with the axle *b* and the wheels *d* are fast thereon. It will thus be seen that the secondary pistons may be actuated by the full energy of the engine or motor, which is transmitted to the driven shaft or member to rotate the same at speeds dependent on the resistance to be overcome.

Figure 5:
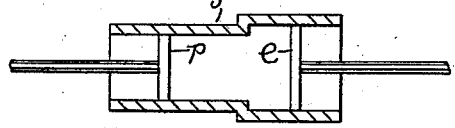

While I may prefer to employ secondary cylinders connected by pipes to the primary cylinder, I do not desire to limit my invention in this respect, as the secondary cylinders may be dispensed with and the secondary piston located in the same cylinder with the primary piston, as represented in Figs. 3 to 5, inclusive. In Fig. 3 the primary cylinder is shown of the same diameter throughout its length, whereas in Fig. 5 the said cylinder is shown of unequal diameters, the primary piston *e* being located in the larger portion of the cylinder and the secondary piston in the smaller portion of said cylinder or, vice versa.

By means of the valve 13 more or less air may be admitted into the primary cylinder to thereby increase or decrease the volume of air in said cylinder, and thus increase or decrease the stroke of the secondary piston to thereby increase or decrease the speed of rotation of the driven member and also to compensate for leakage.

I claim—

1. In an apparatus of the class described, the combination with an engine or motor, of a primary piston actuated thereby, a primary cylinder, a secondary cylinder connected with said primary cylinder, a secondary piston in said secondary cylinder and actuated by the primary piston through an interposed compressible medium, a rotatable device or member, and mechanism connecting said secondary piston with said rotatable device and responsive to variable movements of said secondary piston to produce variable speeds of the rotatable device, substantially as described.

2. In an apparatus of the class described, the combination with a primary piston, its cylinder, and means to actuate said piston, of a secondary piston, its cylinder communicating with the primary cylinder, means to admit a compressible medium into said cylinders between said primary and secondary pistons, a rotatable device, and mechanism to connect said secondary piston with said rotatable device and responsive to variable movements of the secondary piston to produce variable speeds of the rotatable device, substantially as described.

3. In an apparatus of the class described, the combination with an engine or motor, of a primary piston actuated thereby, a primary cylinder, secondary cylinders connected with said primary cylinder and actuated by the primary piston through an interposed compressible medium, rotatable devices, and mechanisms connecting said secondary pistons with said rotatable devices, substantially as and for the purpose specified.

4. In an apparatus of the class described, the combination with an engine or motor, of a primary piston actuated thereby, a primary cylinder, secondary cylinders, pipes connecting said primary cylinder with said secondary cylinders, means to control the passage of a compressible medium from the primary cylinder into said secondary cylinders, secondary pistons in said secondary cylinders, rotatable devices, and mechanisms to connect said secondary pistons with said rotatable devices, substantially as and for the purpose specified.

In testimony whereof I have signed my name to this specification in the presence of two subscribing witnesses.

PAUL WINSOR.

Witnesses:
JAS. H. CHURCHILL,
J. MURPHY.